US007266580B2

(12) United States Patent
Busaba et al.

(10) Patent No.: US 7,266,580 B2
(45) Date of Patent: Sep. 4, 2007

(54) MODULAR BINARY MULTIPLIER FOR SIGNED AND UNSIGNED OPERANDS OF VARIABLE WIDTHS

(75) Inventors: Fadi Y. Busaba, Poughkeepsie, NY (US); Steven R. Carlough, Poughkeepsie, NY (US); David S. Hutton, Poughkeepsie, NY (US); Christopher A. Krygowski, Lagrangeville, NY (US); John G. Rell, Jr., Saugerties, NY (US); Sheryll H. Veneracion, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 10/435,976

(22) Filed: May 12, 2003

(65) Prior Publication Data

US 2004/0230631 A1    Nov. 18, 2004

(51) Int. Cl.
*G06F 7/52* (2006.01)
(52) U.S. Cl. ...................... 708/625; 708/628
(58) Field of Classification Search ............... 708/625, 708/628
See application file for complete search history.

(56) References Cited

U.S. PATENT DOCUMENTS

| 4,390,961 A | 6/1983 | Negi et al. ............ 364/756 |
| 4,484,300 A | 11/1984 | Negi et al. ............ 364/755 |
| 4,809,212 A * | 2/1989 | New et al. ............ 708/625 |
| 5,262,976 A | 11/1993 | Young et al. ............ 364/760 |
| 5,379,245 A | 1/1995 | Ueda ............ 364/756 |

(Continued)

OTHER PUBLICATIONS

"Packed Decimal Multiply Algorithm"; Inventor: Hoffman, RL Schardt, TL; Pubname: TDB 10-75 pp. 1562-1563; Disclosure No. RO8750134; Oct. 1975.

(Continued)

*Primary Examiner*—Tan V. Mai
(74) *Attorney, Agent, or Firm*—Cantor Colburn LLP; Lynn Augspurger

(57) ABSTRACT

A method and apparatuses for performing binary multiplication on signed and unsigned operands of various lengths is discussed herein. It is a concept that may be split into two parts, the first of which is the multiplication hardware itself, a compact, less than-full sized multiplier employing Booth or other type of recoding methods upon the multiplier to reduce the number of partial products per scan, and implemented in such a manner so that a multiplication operation with large operands may be broken into subgroups of operations that will fit into this mid-sized multiplier whose results, here called modular products, may be knitted back together to form a correct, final product. The second part of the concept is the supporting hardware used to separate the operands into subgroups and input the data and control signals to the multiplier, and the algorithms and apparatuses used to align and combine the modular products properly to obtain the final product. These algorithms used to obtain a result as specified by the operation may be as varied as the supporting hardware with which the multiplier may be used, making this multiplier a very flexible and powerful design.

21 Claims, 6 Drawing Sheets

U.S. PATENT DOCUMENTS

| | | | | |
|---|---|---|---|---|
| 5,579,253 A | * | 11/1996 | Lee et al. | 708/625 |
| 5,684,731 A | | 11/1997 | Davis | 364/760 |
| 5,764,558 A | * | 6/1998 | Pearson et al. | 708/625 |
| 5,898,604 A | * | 4/1999 | Winterer | 708/625 |
| 5,920,497 A | * | 7/1999 | Rim | 708/620 |
| 6,035,318 A | | 3/2000 | Abdallah et al. | 708/628 |
| 6,233,597 B1 | * | 5/2001 | Tanoue et al. | 708/625 |
| 6,523,055 B1 | * | 2/2003 | Yu et al. | 708/603 |

OTHER PUBLICATIONS

"High Performance Two Cycle Loop Decimal Multiply Algorithm"; Inventors: Angiulli, JM Chang, DC Hornick, JC Nohilly, WJ Zajac, MW; Pubname: TDB 09-81 pp. 1845-1849; Disclosure No. PO8800209; Sep. 1981.

IBM InfoGate; "Improved Table Assisted Addition and Multiplication Methods"; Inventor: Wingert, JA; Pubname: TDB 02-83 pp. 4742-4743; Disclosure No. CT8800050; Feb. 1983.

* cited by examiner

MODULAR BINARY MULTIPLIER FOR SIGNED AND UNSIGNED OPERANDS OF VARIABLE WIDTHS

BACKGROUND

This invention relates to the field of arithmetic and logic techniques in computer and processor architecture, in particular, the design of a binary multiplier use for use with functionalities found in a common processor environment.

Binary multiplication is the subset of the multiplication operations that deal only with whole numbers, both signed and unsigned, and whose operands and results are therefore fully representable in binary. The simplest method for binary multiplication imitates the human method of execution by which the multiplicand is processed by the multiplier one multiplier digit at a time to form a partial product, and the partial products are summed to form the final product. An example of the human multiplication method as applied to binary numbers is as follows.

Unsigned Multiplication (4-bit×4-bit->8-bit for full result representation)

| | | |
|---|---|---|
| 1110 | multiplicand | 14 |
| 0111 | multiplier | 07 |
| 1110 | pp1 | 98 |
| 1110 | pp2 | 00 |
| 1110 | pp2 | |
| 0000 | pp3 | |
| 01100010 | product | 98 |

The method also works for signed multiplication. However, using 2's complement negative representation and sign extension makes additional processing of the result sign unnecessary.

Signed Multiplication (4-bit×4-bit->8-bit with operands sign-extended to 8)

| | | |
|---|---|---|
| 11111110 | multiplicand | −2 |
| 00000111 | multiplier | +7 |
| 11111110 | pp1 | −14 |
| 1111110 | pp2 | |
| 111110 | pp3 | |
| 00000 | pp4 | |
| 0000 | pp5 | |
| 000 | pp6 | |
| 00 | pp7 | |
| 0 | pp8 | |
| 11110010 | product | −14 |

While this method of multiplication is very simple and relatively easy to implement in hardware with a shifter, an adder, and a product accumulator, if it takes one cycle to process one multiplier bit to form a partial product, an operation with an n-bit multiplier will take in the order of n cycles to finish. Such a long cycle-per-instruction (CPI) time in the current world of high-speed computing is considered a prohibitive solution to achieving to shorter CPI for multiply instructions is to expend additional hardware to calculate the partial products in groups at a time and build the necessary adders to process them simultaneously. This brute force approach of throwing hardware at the problem does decrease CPI but it also increases the chip area dedicated to the multiplication functions. Adders in particular, are difficult to handle, especially with the area and timing constraints that usually accompany the functional specifications. Many methods have therefore been formulated to decrease adder size through decreasing of partial products by processing the multiplier multiple bits at a time. One of the more popular methods is the Booth recoding algorithm.

The Booth recoding algorithm is a method for reducing the number of partial products produced from a given n-bit multiplier through multiple-bit scanning. It is based on the concept that a string of binary ones, where the least significant bit of value '1' holds a significant value of 2n and the string of ones is z bits long, may alternatively be represented as $2^{n+z}-2^n$. For example, the string 0b0111 may be represented as $2^3-2^0=7$, and the string 0b1110 as $2^4-2^1=14$.

In the previous example, the weight of each bit is equal to $2^n$ where n is the positional value of the relevant bit. The detection of a string of ones is done by overlapping the scanned group of multiplier bits by one bit. Applying this counting method to multiplication, where the scanned number is the multiplier in a 1-bit scan with an overlapping bit, is as simple as giving a bit that is at the end of a string (the least significant bit in the string), detected by a '1' bit whose overlapping bit to the right is a '0', a value of $-(2^n)*$(multiplicand); a bit that is at the beginning of the string (the most significant bit of the z-bit string), detected by a '0' in the position with the overlap bit equal to '1', a value of $(2^n)*$(multiplicand); and a bit that is in the middle of a string of 0's or 1's a value of zero. This is summarized in the table below, where the leftmost bit is the bit in position n of the string and the rightmost bit is the overlap bit needed for string detection. The "Justified Multiplicand Value" column gives the multiplicand-multiple value, the significance of this value may be implied with the position of the relevant scanned bit.

TABLE 1

Truth-Table For Radix-2 Booth Recoding

| 2-BIT SCAN | MULTIPLICAND VALUE | JUSTIFIED MULTIPLICAND VALUE |
|---|---|---|
| 00 | 0× | 0× |
| 01 | $(+2^n)×$ | +1× |
| 10 | $(-2^n)×$ | −1× |
| 11 | 0× | 0× |

The key to advantageous implementation of the Booth recoding method is in increasing the number of bits that are scanned in a group, thereby decreasing the overall necessary scans of the multiplier as well as the number of partial products and the hardware necessary to combine the partial products. A popular scan-group size is 3 bits, composed of 2 scanned bits with the an overlap bit in the least significant position. Its popularity is based on the fact that the necessary multiplicand-multiples needed to realize the recording is simply 0×, ±1×, and ±2×, all relatively easy to formulate using shifters, inverters, and two's complementation methods to realize all possible multiples, whereas larger scan-group sizes necessitate adders to formulate higher multiples such as ±3×.

BRIEF SUMMARY OF THE EXEMPLARY EMBODIMENT

Disclosed herein in an exemplary embodiment is a method of binary multiplication comprising: obtaining a multiplicand; obtaining a multiplier; if the multiplier is larger than a selected length, partitioning the multiplier into a plurality of multiplier subgroups; if the multiplicand is larger than a selected length, partitioning the multiplicand into a plurality of multiplicand subgroups and at least one of zeroing out of unused bits of the multiplicand subgroup and sign-extending a smaller portion of the multiplicand subgroup. The method also includes establishing a plurality of multiplicand multiples based on at least one of a selected multiplicand subgroup of the plurality of multiplicand subgroups and the multiplicand; selecting one or more of the multiplicand multiples of the plurality of multiplicand multiples based on the each multiplier subgroup of the plurality of multiplier subgroups; and generating a modular product based on the selection method.

Also disclosed herein in another exemplary embodiment is a binary multiplier for a super-scalar processor comprising: a first register input configured to receive a first operand comprising multiplicand data of up to m bits in length, wherein m bits includes at least one of a full width of a register for the processor or a maximum width of an operand data for a selected binary multiplication instruction; and a second register input configured to receive a second operand comprising one of a multiplier value and a multiplier value subgroup comprising a partition of the multiplier value of n bits in length, wherein n is less than or equal to a maximum width an operand data for a selected binary multiplication instruction. The multiplier also includes a control signal input configured to receive a first control signal indicative of a size of the multiplicand data that enables the multiplier to select from the multiplicand data input relevant bits to form an effective multiplicand and zeroing out of unused bits of the multiplicand data input; and a second control signal input configured to receive a second control signal indicative of whether the multiplicand operation is signed or unsigned, and configured to enable said multiplier to sign-extend the effective multiplicand.

Further disclosed herein in yet another exemplary embodiment is a system for binary multiplication in a superscalar processor comprising: a binary multiplier; a data-width shifter in operable communication with the binary multiplier, the data-width shifter to shift multiplier data and multiplicand data to ensure that selected subgroups are sent to the binary multiplier, and to align a modular product for proper combination with at least one of another modular product and an accumulated modular product; a register in operable communication with the shifter to hold the multiplier data and the multiplicand data for input to the shifter; an adder in operable communication with the register for accumulating a modular product with at least one of another modular product and an accumulated modular product; a plurality of registers in operable communication with the adder to hold the modular product and the accumulated modular product for input to the adder and for output of the accumulated modular product.

Further disclosed herein in yet another exemplary embodiment is a system for binary multiplication in a superscalar processor comprising: a first pipeline including: a first register; a second register; a third register; an execution unit including a bit logic unit and a binary adder in operable communication with the first register, the second register, and a first multiplexer; the first multiplexer also in operable communication with the third register; a first rotator in operable communication with the first register and the execution unit; and a leading zero detection register in operable communication with the execution unit and the second register. The system also includes a second pipeline comprising: a fourth register; a fifth register; a sixth register; a second execution unit including another bit logic unit and another binary adder in operable communication with the fourth register, the fifth register, and a second multiplexer; the second multiplexer also in operable communication with the sixth register; a rotator in operable communication with the fourth register and the execution unit; and a leading zero detection register in operable communication with the second execution unit and the fifth register. The system also includes a third pipeline comprising: a seventh register; a eighth register; a ninth register; a multiplier operable communication with the seventh register and the eighth register; a general register for storage and retrieval of data; an operand buffer for obtaining a first operand and a second operand; and a communication bus for communication among at least two of the first pipeline, the second pipeline, the third pipeline, the general register and the operand buffer.

These and other improvements are set forth in the following detailed description. For a better understanding of the invention with advantages and features, refer to the description and to the drawings.

BRIEF DESCRIPTION OF THE DRAWINGS

The present invention will now be described, by way of an example, with references to the accompanying drawings, wherein like elements are numbered alike in the several figures in which.

The detailed description explains the exemplary embodiments of the invention, together with advantages and features, by way of example with reference to the drawings.

DETAILED DESCRIPTION OF AN EXEMPLARY EMBODIMENT

Disclosed herein in one ore more exemplary embodiments is a method and system architecture for multiplying binary numbers of varying lengths, either signed or unsigned operands with lossy or lossless results, through the use of a specialized super-Booth multiplier whose modularity makes it compatible for use with a variety of supporting Arithmetic Logic Unit (ALU) hardware. The modularity of the architecture is prompted by the need for a smaller multiplier that is still be able to handle larger operands with efficiency. Therefore the architecture represents a compact multiplier that is designed to work with arithmetic and logical functions and resources that may be found in most processor environments. It includes a less than full data-width sized input for a multiplier operand and may include a less than full, if not full, data-width input for a multiplicand. The architecture also includes an overlap bit signal that is instrumental in tying subgroups of multiplication operations together so that they may eventually be combined to form a final, correct product. It also makes use of several additional signals to control and modify the incoming multiplicand data to reflect the type of operation, e.g., signed or unsigned, and to prepare the output, also known as the modular product, for alignment and combination with other possible modular products.

An example of such supportive hardware for use with an exemplary embodiment of the multiplier is also presented herein, with the associated algorithms engendered for implementation of multiplication operations within such an environment.

Figure 1:
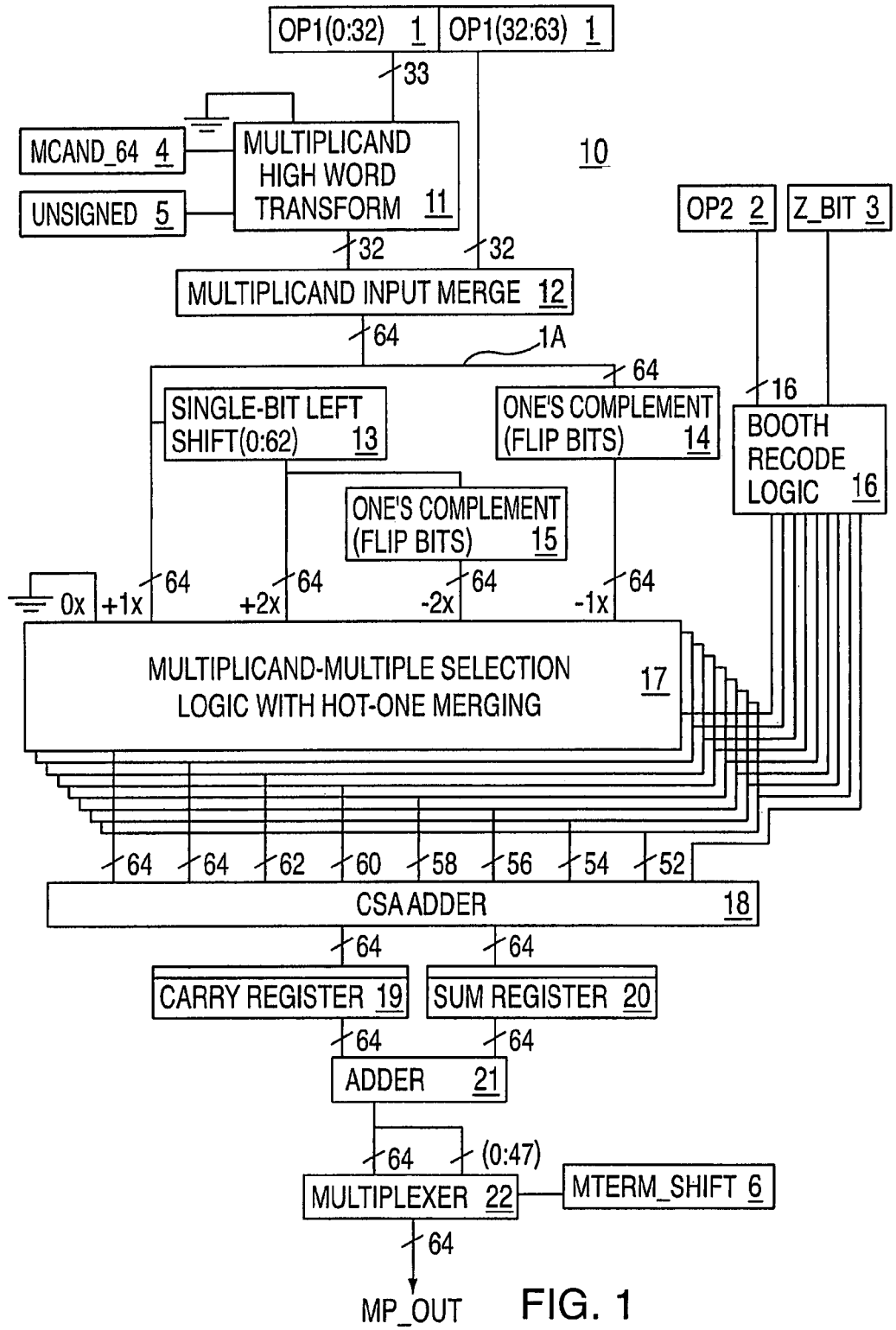
FIG. 1 is an illustration of an exemplary data flow of the binary multiplier architecture.

In an exemplary embodiment a hardware architecture for a multiplier and the supporting hardware is disclosed. In another exemplary embodiment, a multiplication algorithm for processing with the hardware architecture is disclosed. The modular binary multiplier architecture is illustrated by FIG. 1.

The Modular Binary Multiplier

The modular binary multiplier 10 includes, but is not limited to six primary inputs: a first operand represents the 64-bit data used for the multiplicand denoted as 1; a second operand represents the 15-bit data used as the multiplier or multiplier subgroup denoted as 2; an overlap bit between multiplier subgroups denoted as 3, also termed the Z_BIT, provides continuity from one multiplier subgroup to the next and is utilized for the string detection necessary when making use of the Booth recoding algorithm; an operation control signal denoted as 4, also termed MCAND_64, is used to tell the binary multiplier 10 whether the operation is using a 32-bit or a 64-bit multiplicand 1 and, an "unsigned" control signal 5, also denoted UNSIGNED is utilized to prepare the binary multiplier 10 for a signed or unsigned operation; and an MTERM_SHIFT signal 6, is used to shift the modular product output of the binary multiplier 10 so that an additional cycle is not needed to align it properly with other modular products. Table 2 provides a shorthand depiction of the decode logic for the two control signals MCAND_64 4 and UNSIGNED 5.

TABLE 2

Decode of control signals MCAND_64 and UNSIGNED

| MCAND_64 | UNSIGNED | Multiplicand (0:31) Value |
|---|---|---|
| 0 | 0 | b..b where b is operand (32), sign extension |
| 0 | 1 | 0..0 |
| 1 | 0 | invalid |
| 1 | 1 | operand (0:31) |

From Table 2:

[0,0] indicates a signed operation using a 32-bit multiplicand. The low word, bits 32 to 63 of the operand data, are left unmodified while the high word, bits 0 to 31 are sign extended from bit 32 of the multiplicand data;

[0,1] indicates an unsigned, 32-bit operation. The low word of the multiplicand data is kept while the high word is zeroed out in case garbage data came with the relevant low word;

[1,0] represents a signed, 64-bit operation. This is treated as an invalid configuration in this hardware architecture of the binary multiplier 10, because the data width of the input for the multiplicand 1 and the adder is 64 bits, allowing no sign extension and thereby, would result in an improperly representable modular product;

[1,1] indicates an unsigned 64-bit operand and so the high word of the operand data will be used as the high word of the multiplicand.

The decode logic for MCAND_64 and UNSIGNED and the necessary modification of the high word of the multiplicand 1 is depicted in a multiplicand high-word transform module 11. The result of the multiplicand high-word transform module is merged with the unmodified low word of the operand data at merge 12 to form the operating multiplicand data denoted 1A used in the binary multiplier 10. In an exemplary embodiment, the radix-4 form of the Booth algorithm, using a 3-bit scan which is composed of 2 scanned bits and one overlap bit between groups, is used. This form of the Booth algorithm is employed because the formation of the necessary multiplicand multiples, 0×, ±1×, and ±2×, is relatively easy. It will be appreciated that, if the necessary multiplier is +1×, no modification of the multiplicand data is necessary to form the product. Therefore, the +1× case of the operating multiplicand data 1A is depicted directly feeding the selection logic 17.

Continuing now with FIG. 1, a left shifter 13 takes as input the high 63 bits of the multiplicand data and appends a '0'b on the right to form a 1-bit left shift of the data, or as is commonly known a +2× multiple of the multiplicand data, which is also directed to the selection logic 17. The output of shifter 13 is also fed into a one's complement module 15, executing a bit flip, and thereby forming a one's complemented form of +2× multiple of the operating multiplicand data 1A, needing only the addition of a "hot one" in selection logic 17 to complete the formation of a −2× multiple of the operating multiplicand 1A. This addition of a "hot one" is addressed in selection logic 17, along with selection of which multiple of the operating multiplicand 1A to employ based on the recoding of the significant multiplier group bits. Likewise, a one's complement of the operating multiplicand data 1A is formulated with the full 64 bits of the operating multiplicand data 1A by a bit-wise inversion, needing only an addition of a binary '1' to form the two's complement, or the −1× multiple, of the operating multiplicand data 1A. Once again, the addition of a "hot one" is in selection logic 17.

Continuing with FIG. 1, a radix-4 Booth recoding logic function 16 takes sixteen (16) bits of the multiplier at a time and does eight simultaneous and overlapping 3-bit scans to produce eight partial products. Table 3 depicts a decomposition of a 32-bit multiplier, stacked to show the formation of the necessary 16 scans, separated into two groups, to fully process it. In the table, Z represents the aforementioned overlap bit 3 (also denoted Z_BIT), which completes the sequence of 17 bits needed by the scanning algorithm and conveniently allows the accommodation of multipliers larger than 16 bits. Through the proper setting of the Z_BIT 3, the hardware can treat any group of 16 bits identically regardless of whether they comprise the whole or any portion of the multiplier 2.

TABLE 3

Multiplier Decomposition and Scan Groups

| Scan | 8 | 7 | 6 | 5 | 4 | 3 | 2 | 1 |
|---|---|---|---|---|---|---|---|---|
| Group | --- | --- | --- | --- | | | | |
| | | | | | --- | --- | --- | --- |

TABLE 3-continued

Multiplier Decomposition and Scan Groups

| Bits |  |  |  |  |  |  |  |  | 1111222222222233 |
|---|---|---|---|---|---|---|---|---|---|
|  |  |  |  |  |  |  |  |  | 6789012345678901Z |
| Bits | 00 | 00 | 00 | 00 | 00 | 11 | 11 | 11 |  |
|  | 01 | 23 | 45 | 67 | 89 | 01 | 23 | 45Z |  |
|  | -- | -- | -- | -- | -- | -- | -- | --- |  |
| Scan |  |  |  |  |  |  |  |  |  |
| Group | 16 | 15 | 14 | 13 | 12 | 11 | 10 | 9 |  |

A 3-bit internal signal results from each 3-bit scan. Two variables, denoted SX and S2X, determined by the Booth decoding, indicate the absolute coefficient of each multiple. That is, if SX is active, a 1× multiple is used and no special action is necessary. If S2X is active, the operating multiplicand 1A is shifted one position to the left and a zero is brought in to fill the LSB. It will be appreciated that SX and S2X may not be active simultaneously. Moreover, a state where both SX and S2X are inactive, indicates a 0× multiple for he selection logic 17. SINV, the third internal control signal, equals the sign of the multiple as determined by Booth decode for each scan. If a positive multiple is generated, SINV is set to zero and no special action is necessary. In the event of a negative multiple, SINV is set to a '1' and the one's complement form of the 1× and 2× multiple of the multiplicand 1A are chosen. To complete the two's complementation, the active SINV is used as the above mentioned "hot one" that is in-gated into the next partial product (i.e., the next row in the partial product array) in the same column or bit position as the current partial product's LSB. Table 4 depicts a truth-table for the Booth decoding. It will be appreciated that this implementation does not implement a negative-zero. That is, a 3-bit scan equaling '111'b generates the same true-zero decode as '000'b. The effect of true-zero is that the partial product will be sequence of zeroes and, of course, the "hot one" for the next product will be cleared.

TABLE 4

Truth-Table For Radix-4 Booth Recoding

| 3-bit scan | Multiple-Select | SX | S2X | SINV |
|---|---|---|---|---|
| 000 | 0× | 0 | 0 | 0 |
| 001 | +1× | 1 | 0 | 0 |
| 010 | +1× | 1 | 0 | 0 |
| 011 | +2× | 0 | 1 | 0 |
| 100 | −2× | 0 | 1 | 1 |

TABLE 4-continued

Truth-Table For Radix-4 Booth Recoding

| 3-bit scan | Multiple-Select | SX | S2X | SINV |
|---|---|---|---|---|
| 101 | −1× | 1 | 0 | 1 |
| 110 | −1× | 1 | 0 | 1 |
| 111 | 0× | 0 | 0 | 0 |

A dot representation of the rightmost part of the partial product array generated at selection logic function 17, with inputs from the multiplicand-multiple forming logic (e.g., 12, 13, 14, and 15) and with the Booth recoding logic 16, is shown in Table 5. It may be observed from the table that no column employs compression structures requiring more than 15 inputs (partial product bits plus carries). It should further be noted that with only eight scans, there are essentially at most eight partial products, except for column 49 of row nine (partial product 9, or pp9) consisting of the "hot one" from the eighth scan. Fortunately, the column to its right has only seven product terms; indicating one less carry propagates out of column 50 into column 49. Therefore, a 9:2 compression structure with six carries-in, may readily be formulated with adder 18 using an 8:2 compression structure with seven carries-in, and by using pp9's hot 1 as the ninth input rather than as a carry into the adder 18. Stated another way, both the aforementioned structures require exactly 15 inputs, partial product bits plus carries, and produce exactly 9 outputs, sum bit and carries-out.

TABLE 5

Dot representation of the rightmost part of the partial product array

| | Bit Position | | | | | | | | | | | | | | | | | |
|---|---|---|---|---|---|---|---|---|---|---|---|---|---|---|---|---|---|---|
| | 46 | 47 | 48 | 49 | 50 | 51 | 52 | 53 | 54 | 55 | 56 | 57 | 58 | 59 | 60 | 61 | 62 | 63 |
| pp1 | . | . | . | . | . | . | . | . | . | . | . | . | . | . | . | . | . | . |
| pp2 | . | . | . | . | . | . | . | . | . | . | . | . | . | . | . | . | 0 | h |
| pp3 | . | . | . | . | . | . | . | . | . | . | . | . | . | . | 0 | h | | |
| pp4 | . | . | . | . | . | . | . | . | . | . | . | . | 0 | h | | | | |
| pp5 | . | . | . | . | . | . | . | . | . | . | 0 | h | | | | | | |
| pp6 | . | . | . | . | . | . | . | . | 0 | h | | | | | | | | |
| pp7 | . | . | . | . | . | . | 0 | h | | | | | | | | | | |
| pp8 | . | . | . | . | 0 | h | | | | | | | | | | | | |
| pp9 | | | | h | | | | | | | | | | | | | | |

In an exemplary embodiment, the resulting sum and carry results are optionally latched into registers 19 and 20, before being further combined in carry-propagate adder 21 to form one final modular product. This modular product and its 16-bits left-shifted form is fed into a multiplexer 22, which is controlled by the input signal MTERM_SHIFT to decide whether the modular product needs to be left-shifted for alignment purposes or not, as dictated by the current operation's algorithm. The final product output of the binary multiplier 10 is here denoted MP_OUT.

The Supporting Hardware

Figure 2:
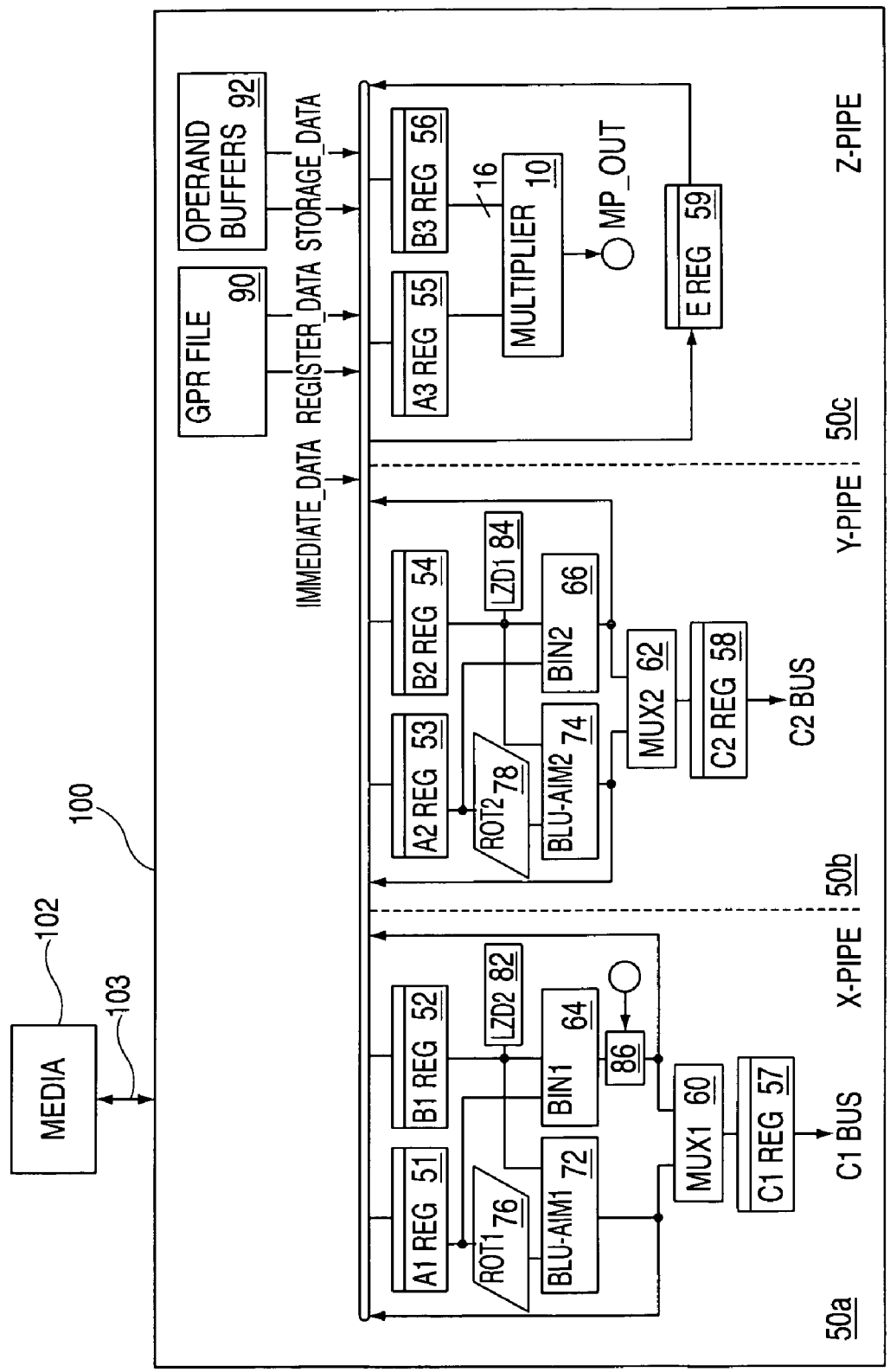
FIG. 2 depicts a simplified block diagram and data flow for a 3-pipe, super-scalar fixed-point processor in accordance with an exemplary embodiment.

FIG. 2 depicts a simplified block diagram and data flow for a 3-pipeline, super-scalar fixed-point processor architecture 200 in accordance with an exemplary embodiment. The 3 pipelines 50 are also denoted as the X pipe 50a, the Y pipe 50b, and the Z pipe 50c respectively. Each of the three pipes 50a, 50b, and 50c are interfaced to a bus and include, but are not limited to at least two 64-bit operand registers, denoted A1 and B1 (51 and 52) for the X pipe 50a, A2 and B2 (53 and 54) for the Y pipe 50b, and A3 and B3 (55 and 56) for the Z pipe 50c. Both the X and the Y pipes 50a and 50b have each an output C register, denoted C1 57 and C2 58 respectively, that are fed via a multiplexor, 60 and 62, respectively. The two output registers C1 57 and C2 58 respectively, are used to write data to a general purpose register file 90 which in turn feeds the operand registers via the REGISTER_DATA buses. The operand registers may also be fed from memory through the operand buffers 92 via the STORAGE_DATA buses. Two values may be written to and four values may be read from the register file in a single cycle. Additional logic not depicted may be included to address data handling such as detecting leading zeroes and checks for valid data. The multiplexers 60 and 62 respectively, are in turn fed by a binary adder unit, denoted as Bin1 64 and Bin2 66 respectively and a bit-logical unit, denoted Blu1 72 and Blu2 74, for the X 50a and the Y pipe 50b, respectively. The bit-logical units Blu1 72 and Blu2 74 are in turn fed by a rotators, denoted, rot1 76 and rot2 78, respectively. The rotators rot1 76 and rot2 78, in conjunction with the bit logical units Blu1 72 and Blu2 74 and with effective use of masking, are utilized in shifting operations as well. Any references made herein to a bit-logical unit, or Blu1 27 or Blu2 74, may be treated to include reference to the rotators rot1 76 and rot2 78 as well as the bit logic units Blu1 27 and Blu2 74 for simplicity and brevity. The contents of registers B1 52 and B2 54 are also interfaced with leading-zero detect logic 82 and 84 for the X pipe 50a and Y pipe 50b respectively, utilized in some of the instructions implemented in this exemplary embodiment hardware architecture 200 for early termination.

The Z pipe 50c includes a third working register, denoted E 59, that is used by some of the instructions to hold information for later use. In an exemplary embodiment, the binary multiplier 10 as illustrated in more detail by FIG. 1, resides in the Z pipe 50c of the fixed-point super-scalar architecture 200. The binary multiplier 10 is fed by the full 64-bit register denoted A3 55 and fed by the least significant 16 bits of the B3 register 56. The output, of the multiplier, denoted MP_OUT, is tri-stated at buffer 86 with the output of the binary adder Bin1 64 of the X pipe 50a to prevent the need for an additional input to the multiplexors feeding the C1 57 register.

The A and B registers 51-56 respectively, take their input from a network of buses fed in part by the register file 90 through the REGISTER_DATA buses, the operand buffers 92 through the STORAGE_DATA buses, and by data contained within the instructions themselves through the IMMEDIATE_DATA bus which takes the data extracted from the immediate field of the instruction text. It is noteworthy to appreciate that because of the pre-alignment of the STORAGE_DATA and the IMMEDIATE_DATA, once the operands reach the working registers A and B 51-56, they may all be treated the same no matter the source of the data.

It will be appreciated that described herein is one implementation of processor architecture 200 working in conjunction with the multiplier 10. Other configurations are possible so long as they include some key functions and capabilities. One of these is the ability to rotate the multiplier 2 and the multiplicand 1, not necessarily simultaneously, to put the proper subgroup in its place for correct subgroup processing. Another is the ability to accumulate the modular products into one final term.

The Multiplication Methodology

Because of the modular nature of the multiplication described above, it will be appreciated that it is now possible to conceive of numerous algorithms to implement a selected operation in a specific architecture and environment. Described herein is a methodology with operations implemented in the aforementioned fixed-point super-scalar processor environment. The methodology highlights certain advantages of employing the multiplier 10 and the available functions in the supporting hardware as depicted by FIG. 2.

Figure 3:
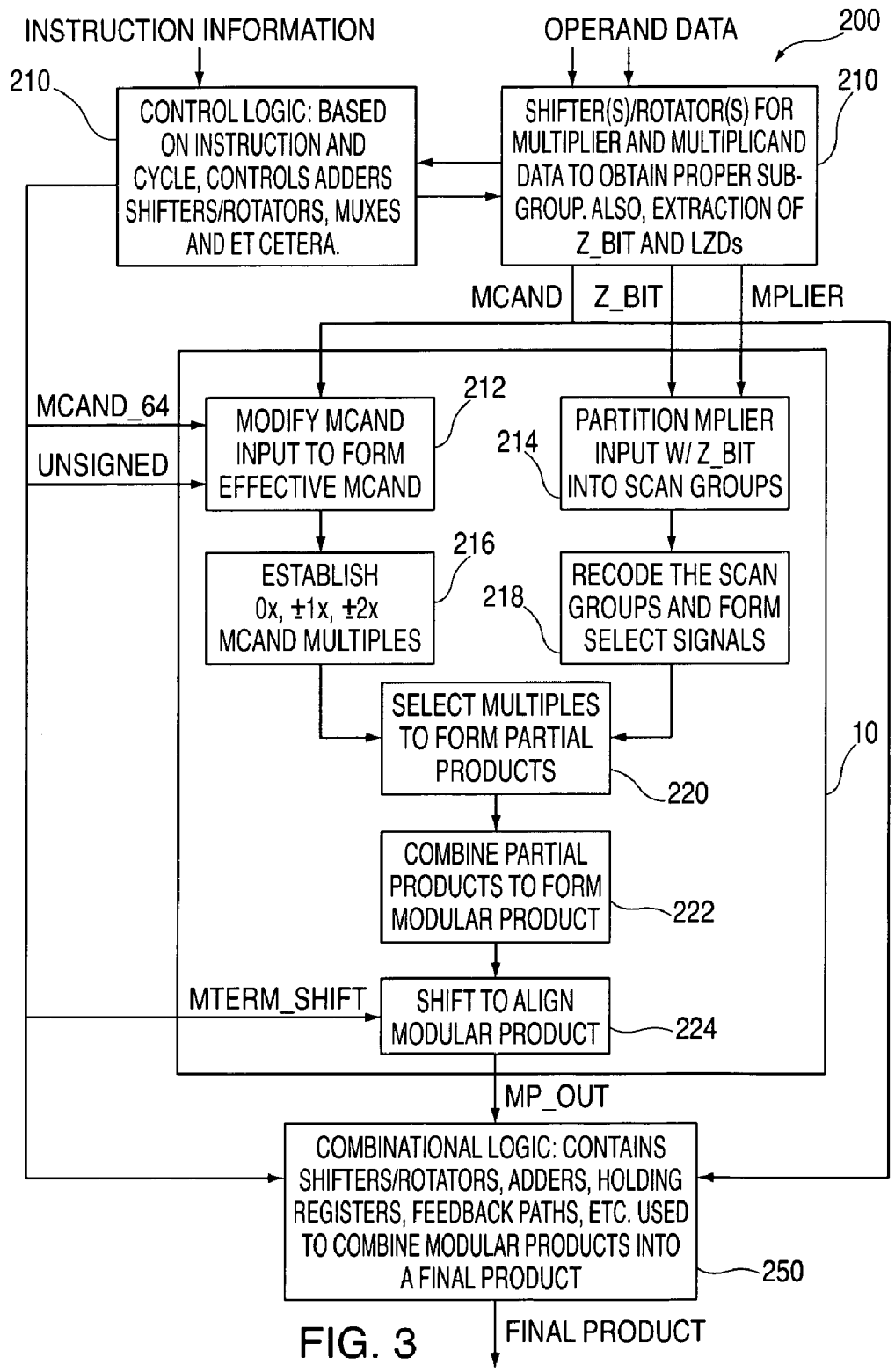
FIG. 3 depicts a flowchart of a multiplication methodology in accordance with an exemplary embodiment.

Turning now to FIG. 3, a flow chart is included to provide a high-level overview of the multiplication process 200 in accordance with an exemplary embodiment. The process takes as input the instruction information, which says which particular multiplication operation is being executed, and the 2 operand data to be used as the multiplicand and the multiplier for the operation. The instruction information goes to the group of logic, here referred to as control logic, and, based on the algorithms used for implementation of the different types of multiplication instructions, controls the data flow hardware to route data where it needs to and perform the necessary functions on a cycle by cycle basis to obtain a final product. In this embodiment it generates the MCAND_64, UNSIGNED, and MTERM_SHIFT control signals. It controls process 210 to properly rotate or shift operand data to obtain the proper multiplicand 1 and/or multiplier 2 sub-group on a cycle-specific and instruction-specific basis, at the same time picking off the proper Z_BIT to go with the multiplier for continuity purposes, necessary in detecting strings of one's. This particular embodiment also provides leading zero and leading one detect functions, used on the multiplier data 2 to provide early termination information to the control logic for some multiplication instructions.

The multiplier 10 in FIG. 3 takes as input the multiplicand data 1 and multiplier data 2. The multiplier data 2, along with the input overlap bit denoted Z_BIT 3, is partitioned into scan groups at process block 214. In this exemplary embodiment, the 16-bit multiplier data with the Z_BIT is partitioned into 8 overlapping scan-groups of 3-bits each, however other multiplier and scan-group widths are possible with proper support, i.e. the establishment of multiplicand multiples, the recoding, the selection logic for the multiples, etc. The multiplier data 2 is recoded in accordance with a radix-4 Booth algorithm at process block 218. Continuing now with the multiplicand 1, at process block 212 the control signals MCAND_64 4 and UNSIGNED 5 are decoded to establish whether the binary multiplication is signed or unsigned, or, in this exemplary embodiment, whether the multiplicand 1 is a 32 or 64 bits. At process block 214, the selected multiples, e.g. 0×, ±1×, and ±2×, of the multiplicand 1 are generated.

Continuing with FIG. 3, at process block 220, based on the result of the Booth recoding at process block 218 of the multiplier 2 and the Z_BIT 3 into 8 groups of SX, S2X, and SINV as previously discussed, the desired multiples of the multiplicand 1 from process block 218 are selected and properly right-appended with zeroes to form partial products. The partial products are summed to formulate a modular product at process block 222. Finally, at process block 224, the modular product output is shifted if necessary/possible based upon the control signal MTERM_SHIFT 6, so that additional cycles are not needed to align this modular product properly for combinational purposes with other modular products within process block 250. In this block, through the use of addition hardware, shifting/rotation hardware, hold paths and feedback paths, and working register and controlled by the control logic block 210, the modular products are combined properly to form the final, correct product. It will be appreciated that different configurations of this block may be employed in this method to process the modular products.

Figure 4:
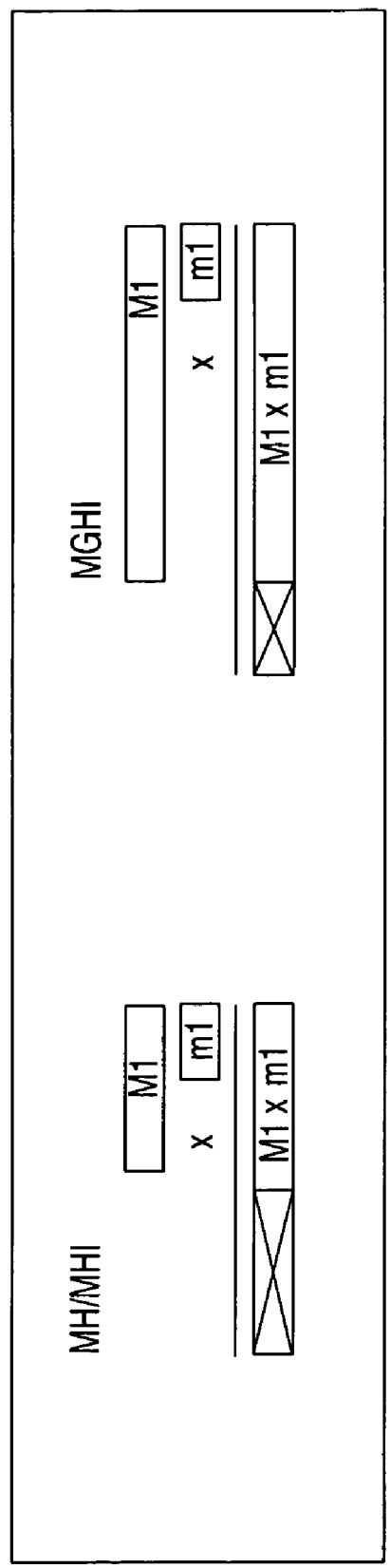
FIG. 4 is a diagram illustrating a lossy binary multiplication instructions.
Figure 5:
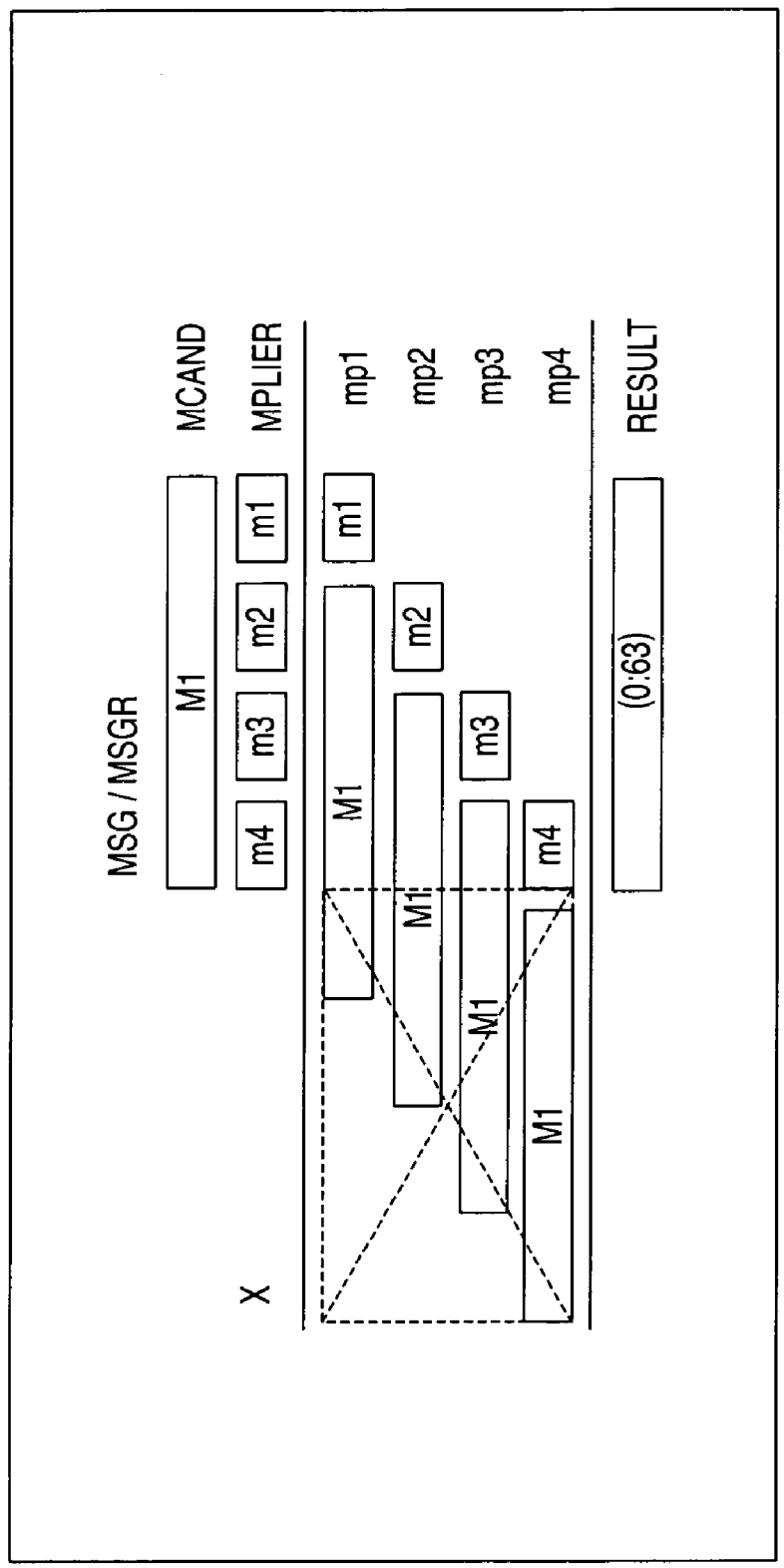
FIG. 5 illustrates two instructions in the multiply-single family of binary multiplication instructions.
Figure 6:
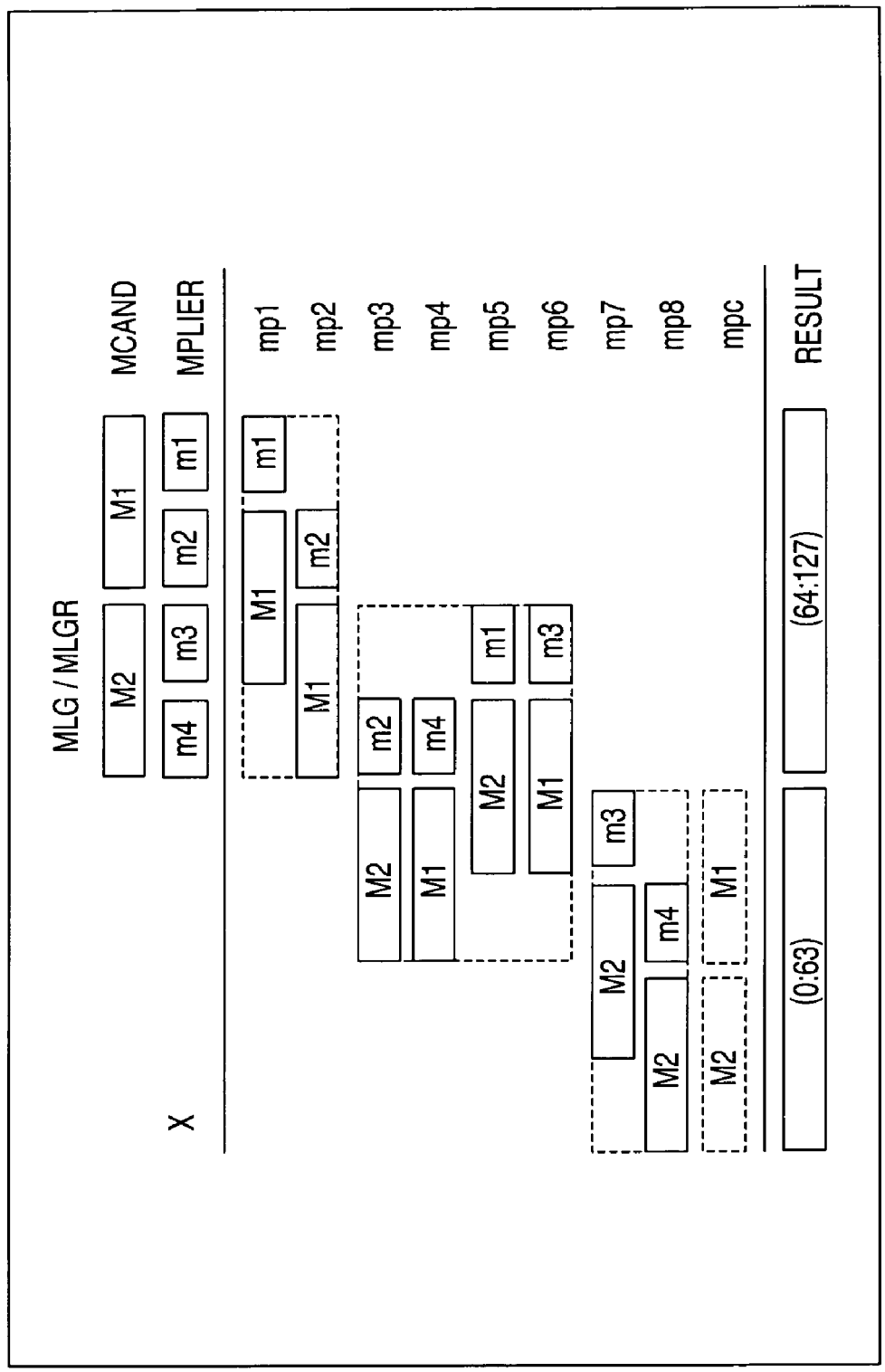
FIG. 6 illustrates a pair of instructions in the multiply logical family of binary multiplication.

Following are detailed explanations of some multiplication instructions that were implemented in this exemplary embodiment of the invention. Referring now to FIGS. 4, 5, and 6 as well, simplified diagrams depicting multiplication operations and related execution algorithms, using the previously described hardware in FIG. 2, the execution process 200, and multiplier hardware 10, is shown. The multiplication algorithms are configured to address various types of multiplication involving differently sized operands.

Operations with Different Sized Multiplicands

Referring now to FIG. 4, an example is presented illustrating an exemplary embodiment with various sized multiplicands 1. In an exemplary embodiment, the multiplier 10 is configured to handle 16 bit×64 bit lossy binary multiplication, producing the least significant 64 bits of the possible 80-bit result. This allows the hardware architecture 200 to process 16-bit by 32-bit operation resulting in the least significant 32 bits of the product, and a 16-bit by 64-bit resulting in the least significant 64 bits of the product, in the same number of cycles. By setting MCAND_64 to zero for the 32-bit operation and to one for the 64-bit operation, the same algorithm may be used to facilitate both types of multiplication operations. The only additional change necessary is in storing away the result: the controls are set for a 32-bit word for the first operation e.g., a 16-bit by 32-bit multiply, and for the full length for the latter, e.g. 16-bit by 64-bit multiply.

For example in FIG. 4, a family of instructions for one processor, e.g, MH, MHI, and MGHI, used to multiply a multiplicand by a half-word, takes full advantage of the aforementioned features. Instructions MH and MHI both result in a 32-bit product; each obtains its multiplicand from a general purpose register (GPR) 90. However, M obtains its multiplier data as an immediate field that is part if the instruction text, while MH obtains its multiplier data from a GPR 90. Similarly, instruction MGHI receives its 64-bit multiplicand data from a GPR 90 and its multiplier data from the immediate field of the instructions text. The multiply halfword immediate family is a set of lossy instructions which take as multiplier input a 16-bit field of the instruction text holding the immediate data. The figure shows that the multiplier is containable in one subgroup and the multiplicand, because of the lossy nature of the result, is also containable in one subgroup, leading to a one-time iteration through the multiplication hardware. Table 6 below depicts an example of the per cycle process upon multiplier data 2 and multiplicand 1 and the interactions with the various register in the X pipe 50A, Y pipe 50B, Z pipe 50C and the multiplier 10. In cycle 1, the multiplier data 2, denoted as M1 in the table, and multiplicand data 1, denoted as m1 in the table are in-gated into the A3 55 and B3 56 registers respectively of the Z pipe 50c. With a latency of one cycle, the modular product, denoted as mp1, in this case also the final product, is presented as an output of the multiplier MP_OUT on the second cycle, considered the finish cycle of the operation, and is put away in storage on the next cycle. Brief note on the syntax used in the tables. When a register is said to receive an "mcand" or "mplier" value, specifying the multiplicand 1 and multiplier 2 operand values respectively, it means that these values are coming from the data bus. As well for this embodiment, the multiplier input comes from the least-significant 16 bits of register B3 56. To obtain the proper multiplier subgroup, one need only rotate or shift the multiplier data so that the necessary sub-group is in the least-significant half-word position.

TABLE 6

Register Contents For Multiplier Processing Cycles

| Cycle | X | Y | Z |
|-------|---|---|---|
| e1 |   |   | A3 = M1 |
|    |   |   | B3 = m1 |
| e2 |   |   | MP_OUT = mp1 |
| PA | C1 = mp1 |   |   |

In cycle e1, operand data which were latched into registers A3 55 and B3 56 (mcand and mplier respectively) are passed into the binary multiplier 10 where the data from the A3 register 55 is used to form the multiplicand data 1 and data from the B3 register 56 is used to form the multiplier data 2. The data from the A3 register 55 denoted as M1 is modified according to the control signals MCAND_64 4 and UNSIGNED 5 to form the effective multiplicand, which is then manipulated via shifting and complementation to help form the ±1× and ±2× multiplicand multiples as previously described for FIG. 1. Meanwhile, in an exemplary embodiment, the first sub-group of the multiplier data 1, coming from the rightmost 16 bits of the B3 register 56, with a right-appended overlap bit, Z_BIT 3 input, which in this case is zero because this is the least significant (and only) subgroup, is undergoing some manipulation as well. This 17-bit string is parsed out into 8 3-bit groups (two bits plus one overlap bit) by the Booth recoding logic in 16 of FIG. 1 to form 8 2-bit signals indicating whether to choose a 1× or a 2× multiple of the multiplicand for each 3-bit scan group (the aforementioned SX and S2X signals), and another group of 8 1-bit SINV signals indicating whether to choose a negative multiple for this group's partial product, as well as providing the in-gated "hot one" to the partial product of the next scan group, in the case of a negative multiple, for completion of the two's complementation process (which involves complementation of a number and an addition of '1'), used to form a negative multiple of the multiplicand. In the same cycle, the 8 partial products and the lone "hot one" input from the eighth group, resulting from the Booth recoding of the 8 3-bit scan-groups, are combined in the adder 18 (FIG. 1) to be compressed into two redundant 64-bit sum and carry terms which are latched into the sum and carry registers, structures 20 and 19 of FIG. 1.

In cycle 2, the data from said sum and carry registers, 20 and 19 respectively, are further reduced into one term through the adder 21. The output, as well as its 16 bits left-shifted form, is placed as input into multiplexer 22 of FIG. 1 and the input control signal MTERM_SHIFT 6 is used to choose between the two. The output of the multiplier, MP_OUT, which in this cycle is the first modular product mp1, is chosen as the output of the tri-state buffer 86 at the output of the binary adder 64 in FIG. 2, and is passed through the multiplexer 60 and latched into the C1 register 57. This is considered the final execution cycle for this instruction, as the final result of the operation has been achieved.

By implementing the multiplication hardware to handle multiple-width multiplicands, effectively the same algorithm with minimal control changes and without the need to pre-format incoming operand data, is used to process multiplication operations of different multiplicand widths. The formatting of the multiplicand data 1 is neatly handled internal to the binary multiplier 10 and controlled by merely 2 signals, one to say what the multiplicand length is, e.g., MCAND_64 4, and another to say whether the operation is signed and unsigned, e.g., UNSIGNED 5, the former signal being showcased in this particular example of an exemplary embodiment.

Reductions In Cycle-Per-Instruction

Another example that shows the flexibility of the disclosed embodiments is based upon an implementation of the MSG and MSGR algorithm. These are both 64×64 operations resulting in a 64-bit lossy product, the difference being MSGR gets its multiplier data 2 from a general purpose register, e.g. register file 90, and MSG gets it data from memory through the operand buffers 92 in this embodiment. The control signal MCAND_64 4 is set to one to obtain a lossy 64-bit result. The operation of the algorithm by cycle is tabulated below in Table 7 and the instruction subgroup processing order is shown in FIG. 5. The figure shows that the multiplier is broken up into four multiplier subgroups, and since the operation is a lossy operation, the full first operand is kept as the 64-bit multiplicand data.

TABLE 7

Register Contents For Multiplier Processing Cycles

| Cycle | X | Y | Z |
|---|---|---|---|
| e1 | A1 = mplier<br>Blu1 = m2 | A2 = mcand = M1<br>B2 = mplier | A3 = M1 (hold)<br>B3 = mplier |
| e2 | | A2 = Blu1 = m2<br>B2 = Bin2 = M1<br>Blu2 = m3<br>Bin2 = −M | A3 = M1 (hold)<br>B3 = m2<br>MP_OUT = mp1 |
| e3 | | A2 = b3 = m2<br>B2 = mp1<br>Blu2 = m4 | A3 = M1 (hold)<br>B3 = m3<br>E = −M1<br>MP_OUT = mp2 |
| e4 | | A2 = mp2<br>B2 = mp1<br>Bin2 = mp1:2 | A3 = M1 (hold)<br>B3 = m4<br>E = −M1<br>MP_OUT = mp3 |
| e5 | | A2 = −M<br>B2 = mp3<br>Bin2 = mp3 | E = mp1:2<br>MP_OUT = mp4 |
| e6 | | A2 = mp4<br>B2 = mp3<br>Bin2 = A2 + B2 = mp3:4 | E = mp1:2 |
| e7 | | A2 = mp3:4<br>B2 = mp1:2<br>Blu2 = mp3:4 << 32 | |
| e8 | | A2 = shifted (mp3:4)<br>B2 = mp1:2<br>Bin2 = A2 + B2 | |
| PA | | C2 = Bin2 = mp1:4 | |

Referring also to FIGS. 1 and 2 once again, in cycle 1 (denoted e1), since the MSG/MSGR is a 64-bit by 64-bit instruction, the full multiplicand data 1 forms the effective multiplicand subgroup M1, the only group in this case. The multiplier data input 2 to the binary multiplier 10, being of a shorter nature than the multiplicand 1, once again takes the 16-bit least significant multiplier data from the B3 register 56 to form a first multiplier subgroup herein also denoted as m1. Multiplicand "subgroup" M1 and multiplier subgroup m1 are processed via the binary multiplier 10 in a similar nature as in the previous example, the redundant sum and carry terms being latched into the sum and carry registers 20 and 19 respectively at the end of the cycle. Simultaneously, in the X pipe 50A, the full multiplier, being previously in-gated into the A1 register, is passed into the bit-logical unit 72 and rotated to place the second multiplier subgroup, hereinafter denoted m2, e.g., bits 32 to 47 of the original multiplier, into the rightmost position (bits 48 to 63) of the data field. The output of the BLU1 72 is then latched at the end of this cycle into registers A2 53 and B3 54 for use in the next cycle.

In cycle 2, the sum and carry registers 20 and 19, holding the result of the previous cycle's multiplication of M1 and m1, are combined to form modular product mp1 as the first output of the binary multiplier 10. This modular product mp1 is also latched in as input to the B2 register 54 at the end of this cycle for use the next cycle. In the meantime, the multiplier is processing subgroup M1*m2 and putting the results into the sum and carry registers 20 and 19 once again. In the Y pipe 50B, the m2 multiplier held in the A2 register 53 is rotated once again such that the third multiplier subgroup m3 is now positioned in the least significant position of the data path. Again, the new multiplier subgroup m3 is in-gated into the B3 register 56 for use in the next cycle.

In cycle 3, the sum and carry registers 20 and 19 respectively holding the result of the previous cycle's multiplication of M1 and m2, are combined to form the next modular product hereinafter denoted m2 and shifted 16-bits to the left to align in preparation for combination with the modular product mp1. The shifted modular product m2 is latched into register A2 for use in the next cycle. In the meantime, the binary multiplier 10 is processing subgroup M1*m3 and putting the product results into the sum and carry registers 20 and 19. In the Y pipe 50B, the m2 multiplier which was in-gated from the B3 register 56 the previous cycle is rotated such that the fourth multiplier subgroup, denoted m4 (e.g., bits 0 to 15 of the original multiplier value) is in the least significant 16-bit position of the data. The result is in-gated to the B3 register 56 for use in the next cycle.

In cycle 4, the sum and carry registers 20 and 19, holding the result of the previous cycle's multiplication of M1 and M3, are combined to form modular product mp3 as the third output of the binary multiplier 10 passed through the multiplexer 22 unshifted, to be latched into the B2 register 54 for use in the next cycle. In the meantime, the A2 and B2 registers 53 and 54, which contain modular products mp1 and mp2 respectively, are added in BIN2 66 to form an accumulated modular product mp1:2 and is in-gated into the E register 59 to be held for later use.

In cycle 5, the sum and carry registers 20 and 19, holding the result of the previous cycle's multiplication of M1 and m4, are combined to form another modular product, denoted mp4, the fourth and final modular product for these instructions, left-shifted coming out of the multiplexer 22 for alignment purposes in combination with modular product mp3. The shifted modular product mp4 is in-gated to the input of the A2 register 53 for use in the next cycle.

In cycle 6, the contents of the A2 register 53 and B2 register 54, mp3 and a left-shifted mp4 respectively, are added in the binary adder Bin2 66 of the Y pipe 50B, to form an accumulated mp3:4 term which is then presented as input to the A2 register 53 for use in the next cycle. In the meantime, the mp1:2 term held in the E register 59 is in-gated into the B2 register 54 for later use.

In cycle 7, the content if the A2 register, e.g., the accumulated modular products mp3:4, is shifted 32 bits to the left to align it preparation for addition with the mp1:2 term as shown in FIG. 4. The alignment occurs in the bit-logical unit BLU2 74 through which mp3:4 is passed and shifted, whereupon the shifted result shifted (mp3:4) is fed back into the A2 register 53 for use in the next cycle.

Finally, in cycle 8, the contents of the A2 and B2 registers 53 and 54, the 32 bit shifted accumulated modular product (mp3:4) and mp1:2 respectively, are combined in the binary adder BIN2 66 to form the final product mp1:4 in this last execution cycle. The final product result is in-gated into the C2 58 register to be put away in the next cycle.

It may readily be seen from Table 7, specifically for the modular product pairs, denoted (mp1, mp2) and (mp3, mp4), that employing the multiplexer 22 and shifter 6 at the end of the multiplier 10 in FIG. 1, to shift the modular product to the left 16 bits advantageously saves processing cycles. Otherwise, the un-shifted modular product (mp2 or mp4) would need to be fed back through the X pipe 50A or Y pipe 50B, shifting, then combining it with the other modular product (mp1 and mp3, respectively), which would utilize two processing cycles instead of the one required for the shift.

An existing function in this particular embodiment of the supporting hardware, depicted in FIG. 2, was used in conjunction with the multiplier hardware 10 and process 200 to save processing cycles, specifically the use of the existing leading-zero detect functions e.g. 82 and 84 (FIG. 1). The leading-zero detect functions 82 and 84 may incorporate minor changes to support leading-one detection to provide complete support of early termination logic for multiplication operations using large operands but whose actual multiplier values are small in magnitude.

Looking back on the multiply single (64-bit) instructions as an example, it may readily be seen that this instruction pair is a perfect candidate for early termination with respect to the multiplier size. Because the multiplier data is processed from right to left, the algorithm can be terminated at strategic points corresponding to the size of the multiplier data. For example, if the multiplier data is in the range of (0×000 to 0×7fff) or (0×FFFFffffFFFF8000 to (0×FFFFffffFFFFffff), the multiplier data is essentially representable by m1 and the execution can be ended after cycle e3 where the modular product mp1 held in the B2 register 54 may be routed to the C2 register 58 as the final output, giving an effective cycle count of three to complete the multiplication instead of the full eight depicted. Similarly, such shortcuts may readily be implemented with different effective lengths of the multiplier data, yielding execution-cycle counts of 3, 4, 5, 6, and 7 for multiplier of effective lengths (i.e. the magnitude may be fully represented by) 15, 31, 32, 47, and 48 bits, respectively. The execution table of the first two early termination cases are shown in Table 8.

Using Booth's algorithm, when doing unsigned multiplication, there may be a corrective term, referred to herein as a modular product correction (mpc) term, that needs to be added because the method for decreasing partial products is based on string detection. Coming to the end of a string (the most significant bit) does not signify an end to the calculations. There is always one or more implicit bit/bits of '0'b value beyond the MSB in unsigned multiplication. When the MSB of the multiplier is a 0, these implied bits to the left of the MSB indicate a continued string of zeroes, resulting in no action. However, an MSB of '1'b with the left-appended zeroes indicates that the end of a string has been reached, in the 3-bit scan case the bits would be a '001'b representing a +1× multiplicand multiple that must be added to the result, aligned so that the LSB of the correction is one bit to the left of the MSB of the multiplier (see FIG. 6). This is why an operation with a multiplier fully representable by 32 bits may take one more cycle than one where the multiplier representable by 31 bits because of the need to include a correction in the final product. Depending on the instruction implementation and the resource, this addition of the mpc term may or may not be buried within the algorithm.

TABLE 8

Register Contents For Multiplier Processing Cycles

| Cycle | X | Y | Z |
|---|---|---|---|
| | | MSG/MSGR(0:14) | |
| e1 | A1 = mplier<br>Blu1 = m2 | | A3 = M1 (hold)<br>B3 = mplier |
| e2 | | | A3 = M1 (hold)<br>B3 = m2<br>MP_OUT = mp1 |
| e3 | | A2 = 0<br>B2 = mp1 | MP_OUT = mp2<br>(shifted) |
| PA | | C2 = bin2 = mp1 | |
| | | MSG/MSGR(0:31) | |
| e1 | A1 = mplier<br>Blu1 = m2 | | A3 = M1 (hold)<br>B3 = mplier |
| e2 | | | A3 = M1 (hold)<br>B3 = m2<br>MP_OUT = mp1 |
| e3 | | B2 = mp1 | A3 = M1 (hold)<br>B3 = m3<br>MP_OUT = mp2<br>(shifted) |
| e4 | | A2 = mp1<br>B2 = mp2<br>bin2 = mp1 + mp2 | |
| PA | | C2 = bin2 = mp1:2 | |

In yet another illustration of an advantage and flexibility of an exemplary embodiment is based on utilization of a logical 64-bit by 64-bit lossless (e.g., where carry over is considered and addressed) multiplication instruction that yields a 128-bit result. Referring to FIG. 6, the lossless characteristic of the product requires the control signal MCAND_64 4 to be set to zero so that all modular products generated are also established as lossless. The figure shows that the multiplier is broken up into four multiplier subgroups; however, the 64-bit multiplicand data is broken up into two subgroups, creating a 16-bit by 32-bit multiplication, to avoid lossy results. Table 9 shows the hardware usage in an implementation of MLG/MLGR in an exemplary embodiment of the invention.

TABLE 9

Register Contents For Multiplier Processing Cycles

| Cycle | X | Y | Z |
|---|---|---|---|
| e1 | A1 = mplier = m1<br>Blu1 = A1 >> 16 = m2 | | A3 = mcand = M1<br>B3 = mplier = m1 |
| e2 | | 1A2 = Blu2 = m2<br>Blu2 = A2 >> 32 = m4 | A3 = M1 (hold)<br>B3 = Blu1 = m2<br>MP_OUT = mp1 |
| e3 | | A2 = mcand<br>B2 = mp1 | B3 = m2 (hold)<br>E = Blu2 = m4 |

TABLE 9-continued

Register Contents For Multiplier Processing Cycles

| Cycle | X | Y | Z |
|---|---|---|---|
|  |  | Blu2 = A2 >> 32 = M2 | MP_OUT = mp2 (shifted) |
| e4 |  | A2 = mp2<br>B2 = mp1 | A3 = Blu2 = M2<br>B3 = m2<br>E = m4 (hold) |
| e5 |  | A2 = mp2 (hold)<br>B2 = mp1 (hold)<br>Bin2 = A2 + B2 = mp1:2 | A3 = mcand = M1<br>B3 = E = m4<br>MP_OUT = mp3 (shifted) |
| e6 |  | B2 = mp3 | E = Bin2 = mp1:2<br>MP_OUT = mp4 (shifted) |
| e7 | A1 = mcand<br>Blu1 = A1 >> 32 = M2 | A2 = mp4<br>B2 = mp3 (hold)<br>Bin2 = A2 + B2 = mp3:4 | E = mp1:2 (hold) |
| e8 | A1 = mplier<br>Blu1 = A1 >> 32 = m3 | A2 = Bin2 = mp3:4 | A3 = Blu1 = M2<br>B3 = mplier = m1<br>E = mp1:2 (hold) |
| e9 |  | A2 = mp3:4 (hold) | A3 = mcand = M1<br>B3 = Blu1 = m3<br>E = mp1:2 (hold)<br>MP_OUT = mp5 |
| e10 |  | A2 = mp3:4 (hold)<br>B2 = mp5<br>Bin2 = A2 + B2 = mp3:5 | B3 = m3 (hold)<br>E = mp1:2 (hold)<br>MP_OUT = mp6 |
| e11 | A1 = mcand<br>Blu1 = A1 >> 32 = M2 | A2 = Bin2 = mp3:5<br>B2 = mp6<br>Bin2 = A2 + B2 = mp3:6 | B3 = m3 (hold)<br>E = mp1:2 (hold) |
| e12 |  | A2 = Bin2 = mp3:6<br>Blu2 = A2 >> 32 = rmp3:6 | A3 = Blu1 = M2<br>B3 = m3 (hold)<br>E = mp1:2 (hold) |
| e13 | A1 = M<br>B1 = Blu2 = rmp3:6<br>Bin1 = A1 + B1 = cmp3:6 | A2 = Blu2 = rmp3:6<br>B2 = E = mp1:2<br>Bin2 = mp1:6 | A3 = M2 (hold)<br>B3 = m3 (hold) |
| e14 |  | A2 = mplier<br>B2 = cmp3:6<br>Blu2 = A2 >> 48 = m4<br>C2 = Bin2 = mp1:6 | A3 = M2 (hold)<br>MP_OUT = mp7 |
| e15 |  | A2 = mp7<br>B2 = cmp3:6 (hold)<br>Bin2 = mp3:7 | A3 = M2 (hold)<br>B3 = Blu2 = m4 |
| e16 |  | A2 = mp3:7<br>Bin2 = A2 = mp3:7 | MP_OUT = mp8 (shifted) |
| e17 | A1 = mp8<br>B1 = Bin2 = mp3:7<br>Bin1 = A1 + B1 = mp3:8 |  |  |
| PA | C2 = Bin2 = mp3:8 |  |  |

In cycle e1, the binary multiplier 10 processes the subgroup M1*m1 while in the X pipe 50A, the bit-logical unit BLU1 72 rotates the multiplier data 2 to produce the second multiplier subgroup m2 which is latched into the A2 register 53 and B3 register 54 for use in the next cycle.

In cycle 2, the binary multiplier 10 processes the multiplier subgroup M1*m2 and finishes compressing the result of M1*m1 into the modular product term mp1 to be in-gated into the B2 register 54 for use in the next cycle. In the Y pipe 50B, the contents of the A2 register 53, m2 (from last cycle), is rotated in BLU2 74 to produce the multiplier subgroup m4 to be latched into the E register 59 for later use. Register A2 53 in-gates the multiplicand data, mcand, from the bus for use in the next cycle.

In cycle 3, the binary multiplier 10 finishes compressing the result of M1*m2, shifts the result 16 bits to the left to align the modular product term m2 for a later combination with mp1, and in-gates it to the A2 register 53 for use in the next cycle. Register B3 56 holds its m2 data for later use. Meanwhile, in the Y pipe 50B, bit logic unit BLU2 74 rotates the multiplicand data to produce the second multiplicand subgroup M2, to be in-gated into register A3 55 for use in the next cycle.

In cycle 4, the binary multiplier 10 processes the subgroup M2*m2. The m4 content of the E register 59 is fed into the B3 register 56 for use in the next cycle, and the A3 register 55 takes from the bus the multiplicand data forming the subgroup M1 for use in the multiplier the next cycle.

In cycle 5, the binary multiplier 10 processes the subgroup M1*m4 and finishes compressing the result of M2*m2, shifts it 16 bits to the left to form the modular product mp3, and in-gates it to the B2 register 53 for later use. In the Y pipe 50B, the contents of register A2 53 and register B2 54 are added to form the combined modular products mp1:2 that is then in-gated into the E register 59 in the Z pipe 50C for later use.

In cycle 6, the binary multiplier 10 finishes compressing the result of M1*m4, shifts the result 16 bits to the left to form th modular product mp4, and in-gates the result into register A2 53 for use in the next cycle. Register A1 51 of the X pipe 50A in-gates the multiplicand value from the bus for use in the next cycle.

In cycle 7, BIN2 66 adds the previously in-gated mp4 data from register A2 53 and the previously held mp3 data from register B2 54 to form the combined modular product mp3:4, to be in-gated into register A2 53 for later use. In the meanwhile in the X pipe 50A, BLU1 72 takes the mcand data from register A1 51 and rotates it to produce the second multiplicand subgroup M2 to be in-gated into A3 55 register for use the next cycle. Register A1 51 in-gates the multiplier value from the bus for use the next cycle. Register B3 56 also latches in the multiplier value from the bus to use the first multiplier subgroup m1 in the next cycle.

In cycle 8, the multiplier processes the subgroup M2*m1 and latches the multiplicand into the A3 register 55 to use the first multiplicand subgroup M1 in the next cycle. In the X pipe 50A, the multiplier being held in the A1 register 51 is rotated to produce the third multiplier subgroup m3, and is latched into register B3 56 for use in the next cycle.

In cycle 9, the multiplier processes the subgroup M1*m3 and finishes processing the result of M2*m1 to produce the modular product mp5 to be latched into the B2 register 54 for use in the next cycle. Register B3 56 holds its m3 value for later use.

In cycle 10, the multiplier finishes processing the result of M1*m3 to produce the modular product mp6 to be latched into the B2 register 54 for use in the next cycle. In the meantime in the Y pipe 50B, binary adder BIN2 66 is adding the contents of A2 register 53 and B2 register 54, mp3:4 and mp5 respectively, to produce the combined modular products mp3:5. In the X pipe 50A, the A1 register 51 latches in the multiplicand from the bus for use in the next cycle.

In cycle 11, the BIN2 66 adds the contents of register A1 53 and register B2 54 to form the combined modular product mp3:6 in the Y pipe 50B. In the X pipe 50A, BLU1 72 processes the multiplier data from register A1 51 to form the second multiplicand subgroup M2 to be in-gated into register A3 55 for later use.

In cycle 12, in the Z pipe 50C, the M2 and m3 values are held in the A3 register 55 and the B3 register 56 for use in the next cycle. Meanwhile in the Y pipe 50B, the mp3:6 data in register A2 53, in-gated from BIN2 66 the previous cycle, is rotated in BLU2 74 such that the low 32-bit word is swapped with the high 32-bit word to form the rotated modular product rmp3:6, necessary to align it in combination with the other modular products to form the 128-bit final result. The B2 register 54 latches in the mp1:2 data from the E register 59 for use in the next cycle. In the X pipe 50A, the multiplicand is in-gated into the A1 register 53 for possible use in the next cycle.

In cycle 13, the multiplier processes the subgroup M2*m3. In the Y pipe 50B, the rotated modular product rmp3:6, with its lower word zeroed out, is combined with mp1:2 to form the least significant doubleword of the quadword result. This is latched into register C2 58 to be put away in the next cycle. Register A2 53 in-gates the multiplier data from the bus for use in the next cycle. Meanwhile, in the X pipe 50A, the multiplicand data is conditionally added to the low word of the rotated modular product rmp3:6 to form the corrected modular product cmp3:6 should the most significant bit of the multiplier data happen to be a '1' bit. This result is in-gated into the B2 register 54 for later use.

In cycle 14, the binary multiplier 10 finishes compressing the result of M2*m3 to form the modular product mp7 to be in-gated into register B2 54 for use the next cycle. The A3 register 55 in the Z pipe 50C holds its M2 value for use in the next cycle. The multiplier data residing in register A2 53 is passed through BLU2 74 to form the fourth multiplier subgroup m4 which is latched into register B3 56 for use in the next cycle.

In cycle 15, the binary multiplier 10 processes the subgroup M2*m4. In the Y pipe 50B, the BIN2 66 combines the modular product mp7 in the A2 register 53 and the corrected modular product cmp3:6 to form mp3:7, to be latched into the A2 register 53 for use in the next cycle.

In cycle 16, the binary multiplier 10 finishes compressing the result of M2*m4 and shifts the result 16 bits to the left to form the modular product mp8, which is in-gated into register A1 51 for use in the next cycle. The mp3:7 data in register A2 52 is passed through BIN2 66 to be in-gated into register B2 54 for use in the next cycle.

In cycle 17, the final cycle of execution, the data in register A1 51 and register B1 52 is combined to form the most significant doubleword of the final result, with the correction already accounted for. It is latched into register C1 57 to be put away the next cycle.

The previous example, showing how the hardware may be employed in a lossless multiplication operation.

Advantageously, the previous example of an implementation employing a lossless instruction indicates how the multiplier 10 of an exemplary embodiment may readily be configured to handle data where the multiplier 2 and multiplicand 1 are of much larger width than the actual multiplication hardware data path. Observation of FIG. 6 indicates that the modular products may be calculated in different combinations. It will be appreciated that the particular order depicted is only one of numerous ways of implementing these operations. If the hardware, for example, supported immediate shifting out and storing of the final product as soon as it is calculated, then the mp5:mp6 order may be switched with the mp3:mp4 order to accomplish this. Or, to support early termination for a particular operation, similar to the exemplary embodiments described above for implementation of instructions such as MSG/MSGR, the ordering may be arranged to process the multipliers 2 from right-to-left. Such "out-of-order" processing of the multiplication sub-groups ultimately makes for a flexible, powerful, and mid-sized multiplication hardware.

The disclosed invention can be embodied in the form of computer, controller, or processor 100 implemented processes and apparatuses for practicing those processes. The present invention can also be embodied in the form of computer program code containing instructions embodied in tangible media 102, such as floppy diskettes, CD-ROMs, hard drives, or any other computer-readable storage medium, wherein, when the computer program code is loaded into and executed by a computer, controller, or processor 100, the computer, controller, or processor 100 becomes an apparatus for practicing the invention. The present invention may also be embodied in the form of computer program code as a data signal 103, for example, whether stored in a storage medium, loaded into and/or executed by a computer, controller, or processor 100, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor 100 the computer program code segments configure the processor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A binary multiplier for a super-scalar processor comprising:
   an input merge register configured to receive a first operand comprising multiplicand data of up to m bits in length, wherein m bits includes at least one of a full width of a register for the processor or a maximum width of an operand data for a selected binary multiplication instruction;
   recording logic configured to receive a second operand comprising one of a multiplier value and a multiplier value subgroup comprising a partition of said multiplier value of n bits in length, wherein n is less than or equal to a maximum width an operand data for a selected binary multiplication instruction;
   transform logic configured to receive a first control signal indicative of a size of said multiplicand data that enables said multiplier to select from said multiplicand data input relevant bits to form an effective multiplicand and zeroing out of unused bits of said multiplicand data input; and
   said transform logic further configured to receive a second control signal indicative of whether said multiplicand operation is signed or unsigned, and configured to enable said multiplier to sign-extend said effective multiplicand.

2. The multiplier of claim 1 further comprising a multiplexer configured to receive a third control signal which enables said multiplier to shift a modular product to align with other modular products for combination.

3. The multiplier of claim 1 wherein said first control signal facilitates interpretation of a length of said multiplicand data.

4. The multiplier of claim 1 wherein said second control signal controls whether a multiplication is perceived as a signed or unsigned operation, and whether said multiplicand data is treated as one of signed and unsigned, using two's complement form for negative representation.

5. The multiplier of claim 1 wherein said first control signal works in conjunction with said second control signal to characterize and modify said multiplicand data to avoid a lossy result, to provide a lossless result with no additional processing to obtain the proper sign.

6. The multiplier of claim 1 wherein said recoding logic is further configured to receive an overlap bit, said overlap bit providing continuity between two multiplier value subgroups and thereby permitting accommodation of multiplication operations with multipliers of length larger than n bits.

7. The multiplier of claim 1 wherein said recoding logic is employed on said one of a multiplier value and a multiplier value subgroup to generate a reduced number of partial products.

8. The multiplier of claim 7 wherein said recoding logic includes a radix-4 Booth algorithm.

9. The multiplier of claim 7 wherein said recoding logic generates a multi-bit signal for each scan-group, employing at least one bit indicate which multiple of said multiplicand data to select and another bit to indicate a positive or a negative multiple thereof.

10. The multiplier of claim 7 wherein said recoding logic generates a 3-bit signal for each scan-group, wherein two bits indicate whether to choose at least one of a ±1× and a ±2× multiple of said multiplicand data, and a third bit indicates a positive or a negative multiple.

11. The multiplier of claim 10 further comprising selection logic using said third bit as a "hot one" that is in-gated into a subsequent partial product in the same column or bit position as a current partial product's least significant bit to complete a two's complementation to achieve negative multiple of said multiplicand data.

12. The multiplier of claim 1 wherein a plurality of partial products are processed through an adder to compress said plurality of partial products down to two product terms.

13. The multiplier of claim 1 further including a shifter and multiplexer combination operably connected to an output of an adder to shift a modular product n bits left to facilitate combination with other modular products with respect to alignment of said modular products based on respective size of one of a multiplier value and a multiplier value subgroup.

14. A system for binary multiplication in a superscalar processor comprising:
   a binary multiplier;
   a data-width shifter in operable communication with said binary multiplier, said data-width shifter to shift multiplier data and multiplicand data to ensure that selected subgroups are sent to said binary multiplier, and to align a modular product for proper combination with at least one of another modular product and an accumulated modular product;
   a register in operable communication with said shifter to hold said multiplier data and said multiplicand data for input to said shifter;
   an adder in operable communication with said register for accumulating a modular product with at least one of another modular product and an accumulated modular product;
   a plurality of registers in operable communication with said adder to hold said modular product and the accumulated modular product for input to said adder and for output of said accumulated modular product.

15. The system of claim 14 further including a leading-zero detect logic for detection of small operand magnitudes for unsigned multiplier data to control possible early termination logic for longer-running operations with relatively wide multiplier data.

16. The system of claim 14 further including a leading-one detect logic for detection of small operand magnitude for negatively signed multiplier data to control possible early termination logic for longer-running operation with relatively wide multiplier data.

17. The system of claim 14 further including another data-width shifters to shift said multiplier data and said multiplicand data.

18. The system of claim 14 further including another adder to combine redundant terms into one modular product.

19. The system of claim 14 further including another register if said multiplier output is in redundant form, wherein two registers hold redundant terms for input to said adder to combine said redundant terms into one modular product, and said another register to hold said accumulated modular products.

20. The system of claim 14 wherein said multiplier is configured to switch between different lengths of multiplicand data through the use of a control signal for multiplication operations utilizing equivalent sized multiplier data and differently sized multiplicands.

21. The system of claim 14 wherein said multiplier is configured such that said multiplier and said multiplicand subgroups may be processed in any order to account for limitations in the available supporting hardware to accommodate large operands and large results, or to accommodate for early termination logic.

* * * * *